United States Patent
Burger et al.

[11] Patent Number: 6,126,429
[45] Date of Patent: Oct. 3, 2000

[54] COMBINATION SLIDE RETAINER AND POSITION SENSING SWITCH FOR INJECTION MOLDS

[75] Inventors: Philip M. Burger, Lenexa; Wayne A. Priest, Kansas City; David L. Lewis, Mulvane, all of Kans.

[73] Assignee: Burger Engineering, Inc., Olathe, Kans.

[21] Appl. No.: 09/088,901

[22] Filed: Jun. 2, 1998

[51] Int. Cl.[7] ................................................. B29C 33/00
[52] U.S. Cl. ................... 425/169; 425/139; 425/DIG. 58
[58] Field of Search .................... 425/139, 165, 425/169, DIG. 5, DIG. 58, 577, 138, 150; 264/40.5

[56] References Cited

U.S. PATENT DOCUMENTS

| | | | |
|---|---|---|---|
| 2,994,921 | 8/1961 | Hultgren | 425/308 |
| 3,078,515 | 2/1963 | Wintriss . | |
| 3,242,533 | 3/1966 | Wintriss . | |
| 3,702,153 | 11/1972 | Frey . | |
| 3,859,029 | 1/1975 | Kammer | 425/441 |
| 3,920,364 | 11/1975 | Cadogan-Rawlinson et al. . | |
| 4,345,889 | 8/1982 | Sizemore et al. . | |
| 4,362,291 | 12/1982 | Fuke et al. | 249/144 |
| 4,421,467 | 12/1983 | Richmond . | |
| 4,502,660 | 3/1985 | Luther et al. | 249/144 |
| 4,515,342 | 5/1985 | Boskovic | 249/122 |
| 4,536,144 | 8/1985 | Hehl . | |
| 4,765,585 | 8/1988 | Wieder . | |
| 4,768,747 | 9/1988 | Williams et al. . | |
| 4,828,480 | 5/1989 | Smith | 425/562 |
| 4,854,849 | 8/1989 | Sudo | 425/556 |
| 4,889,480 | 12/1989 | Nakamura et al. | 425/577 |
| 5,028,748 | 7/1991 | Sakamoto . | |
| 5,207,316 | 5/1993 | Sakamoto . | |
| 5,234,329 | 8/1993 | Vandenberg | 425/186 |
| 5,244,372 | 9/1993 | Ramsey et al. . | |
| 5,312,243 | 5/1994 | Mertz | 425/577 |
| 5,338,171 | 8/1994 | Hayakawa et al. . | |
| 5,397,226 | 3/1995 | Vandenberg | 425/192 R |
| 5,891,209 | 4/1999 | Lovell et al. | 425/450.1 |

OTHER PUBLICATIONS

Sales Literature of D–M–E Standard Slide Retainers, exact publication date unknown, but at least one year prior to the filing of the present application.

Sales Literature of Carr Lane Manufacturing Co., St. Louis, MO, exact publication date unknown, but at least as early as Dec., 1993.

*Primary Examiner*—Harold Pyon
*Assistant Examiner*—Emmanuel Luk
*Attorney, Agent, or Firm*—Shughart, Thomson & Kilroy P.C.

[57] ABSTRACT

A position sensing switch combined with a slide retainer for injection molds of the type having at least a portion of the molding cavity formed in slides which are slidingly mounted on one of a pair of mold halves such that the slides advance between open and closed positions laterally relative to the mold halves as the mold halves are similarly advanced between open and closed positions. The slide retainer comprises a locking member, such as a spring loaded plunger secured on the slide, and a receiver, such as a detent formed on a slide plate of the mold half to which the slide is slidably connected. The detent is formed in a cover plate extending over a cavity extending into the slide plate and in which the switch is positioned. The switch is positioned with its plunger in alignment with a hole extending through the cover plate and into the detent such the slide retainer plunger engages the switch plunger, directly or indirectly, when the slide retainer plunger is advanced into the detent, activating or changing the switch condition and electronically verifying the position of the slide in the open position. The switch is mounted on a pivotal switch bracket within the cavity which permits adjustment of the position of the switch plunger relative to the detent to adjust the sensitivity of the switch.

20 Claims, 4 Drawing Sheets

COMBINATION SLIDE RETAINER AND POSITION SENSING SWITCH FOR INJECTION MOLDS

BACKGROUND OF THE INVENTION

The present invention relates to a combination slide retainer and position sensing switch for injection molds.

An injection molding machine includes stationary and movable mold halves mounted therein. The movable mold half is sidlingly advanced by the molding machine, between an open and a closed position relative to the stationary mold half. It is often necessary or desirable to form all or part of the mold cavity on slides which move laterally (ninety degrees) relative to the direction of opening and closing of the mold halves to facilitate the forming of certain side details on the molded part such as undercuts or laterally extending holes. Typically, angled cam pins mounted on the stationary mold half cooperate with inclined bores in the slides to advance the slides between an open and closed alignment laterally relative to the mold halves as the mold halves are advanced between open and closed alignments.

In a mold cycle, the mold halves are first advanced to a closed alignment, such that the slides similarly advance to a closed alignment forming the mold cavity. Plastic is injected into the mold cavity through a nozzle to form the molded part. After a preset amount of time, calculated to permit the molded part to cool sufficiently, the movable mold half is advanced away from the stationary mold half causing the slides to advance laterally relative to the movable mold half and the molded part. Ejector pins or sleeves, are then advanced out of the movable mold half to engage and eject the molded part out of the mold. The ejector pins or sleeves are retracted and the cycle is repeated.

During the molding cycle, it is important to maintain the slides in the open position while the molded part is ejected and until the movable mold half is advanced back toward the stationary mold half, to prevent damage to the mold. If a slide slips out of the open position, before closing of the mold, the inclined bore in the slide will not line up with the angled cam pin when the mold is closed, which can result in damage to the slide, the cam pin or both. In addition, it is important to be able to verify that the slides have advanced to and remain in the open position before the ejector pins or sleeve are advanced out of the movable mold half. If a slide failed to advance to the open position when the mold halves were opened or slipped back to the closed position before the ejector pins or sleeves are advanced out of the movable mold half, engagement of the slide by an ejector pin or sleeve as it is advanced out of the movable mold half could result in costly damage to the mold cavity in the slide or to the ejector pin or sleeve.

Various slide retainers have been developed to hold the slides in the open position and release the slides upon application of sufficient force, such as the force exerted on the slides by the cam pins advancing into the inclined bores of the slides as the mold halves are closed. It is well known to use a spring loaded ball plunger and detent system as a slide retainer. The ball plunger being mounted in a bore formed either in the inner surface of the slide or the outer surface of the mold half to which it is attached, and the detent is formed on the other surface. U.S. Pat. No. 4,765,585 discloses a slide retainer for injection molds generally comprising a variation of a ball plunger and detent system. U.S. Pat. No. 4,768,747 discloses a slide retainer generally comprising a clip having flexible jaws adapted to releasably engage a pin or dowel mounted on a slide to hold the slide in the open position.

Although existing slide retainers do function to releasably hold a slide in an open position until the mold is closed, the existing slide retainers do not provide feedback to verify that the slide is actually in the open position. It is known to mount switches externally of the mold halves with actuators mounted on the slides so as to engage and actuate the switch upon opening of the mold and it is also known to mount switches on a mold half adjacent the outermost position of a slide in the open position such that the switch is actuated by advancement of the slide to the open position. However, because such switches are mounted externally of the mold or generally exposed during the molding process, they are highly susceptible to damage and malfunctioning.

There remains a need for a system for releasably retaining an injection mold slide in an open position until the mold is subsequently closed and which provides feedback to a controller for the mold to verify that the slide is in the open position.

SUMMARY OF THE INVENTION

The present invention comprises a position sensing switch combined with a slide retainer for injection molds. The combination position sensing switch and slide retainer is particularly well adapted for use with molds of the type having at least a portion of the molding cavity formed in slides which are slidingly mounted on one of a pair of mold halves such that the slides advance between open and closed positions laterally relative to the mold halves as the mold halves are similarly advanced between open and closed positions.

The slide retainer generally includes a locking member and a receiver. The locking member is secured to one of either the slide or a slide plate on which the slide is slidably mounted. The receiver is mounted or formed on the other of the slide or slide plate and positioned to releasably receive the locking member when the slide is advanced outward to an open alignment as the mold halves are opened to prevent further movement of the slide relative to the slide plate until the mold halves are drawn together again. The position sensing switch is positioned relative to the locking member and the receiver such that advancement of the locking member into the receiver actuates or changes the condition or state of the switch. The switch is electronically connected to the control system of the molding machine such that ejector pins or sleeves for ejecting the finished molded part out of the mold are not actuated unless the switch condition indicating that the locking member is positioned within the receiver is satisfied. The control system of the mold is also set to prevent the mold from initiating the closing of the mold unless the switch condition indicating that the locking member is positioned within the receiver is satisfied.

In a preferred embodiment, the locking member comprises a plunger, the slide retainer plunger, positioned within a bore formed in a slide and biased out of the bore by a spring. The receiver comprises a detent formed in a cover plate covering a cavity extending into the slide plate of the mold half to which the slide is secured. The detent is sized and positioned to receive a head of the slide retainer plunger when the slide is advanced to an open position relative to the slide plate. The slide retainer plunger head and the detent are cooperatively shaped to retain the slide retainer plunger head in the detent until the mold halves are drawn together upon closing of the mold. A switch is positioned within the cavity such that advancement of the slide retainer plunger head into the detent activates or changes the switch condition. More specifically, the switch is a plunger type switch positioned beneath the cover plate such that the switch plunger is aligned with a hole extending through the cover plate and into the detent. Advancement of the slide retainer plunger head into the detent either directly or indirectly compresses the switch plunger activating or changing the condition of the switch.

The combination slide retainer and position sensing device therefore simultaneously functions to releasably retain the slide in the fully open position and provides feedback to a control system for the molding apparatus to verify that the slide is in the fully open position.

OBJECTS AND ADVANTAGES OF THE INVENTION

Objects of the present invention include: providing a mechanism for releasably retaining a slide of an injection molding apparatus in a fully open position until the mold is closed which also provides feedback to a control system for the molding apparatus to verify that the slide is in the fully open position; providing a mechanism which prevents further advancement of the molding apparatus through a molding cycle unless the slide is positioned in the fully open position; providing such a mechanism which prevents actuation of the ejection mechanism for the molding apparatus unless the slide is in the fully open position; providing such a mechanism which prevents initiation of the closing of the mold unless the slide is in the fully open position; and providing such a mechanism which reduces the likelihood of damage to the mold due to misplacement of the slide during the molding cycle.

It is an object of this invention to provide such a mechanism which is relatively simple and inexpensive to install; to provide such a mechanism which is relatively unexposed and therefore relatively non-susceptible to damage during a normal molding cycle; to provide such a mechanism which is relatively reliable; and to provide such a system which is particularly well adapted for its intended uses thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
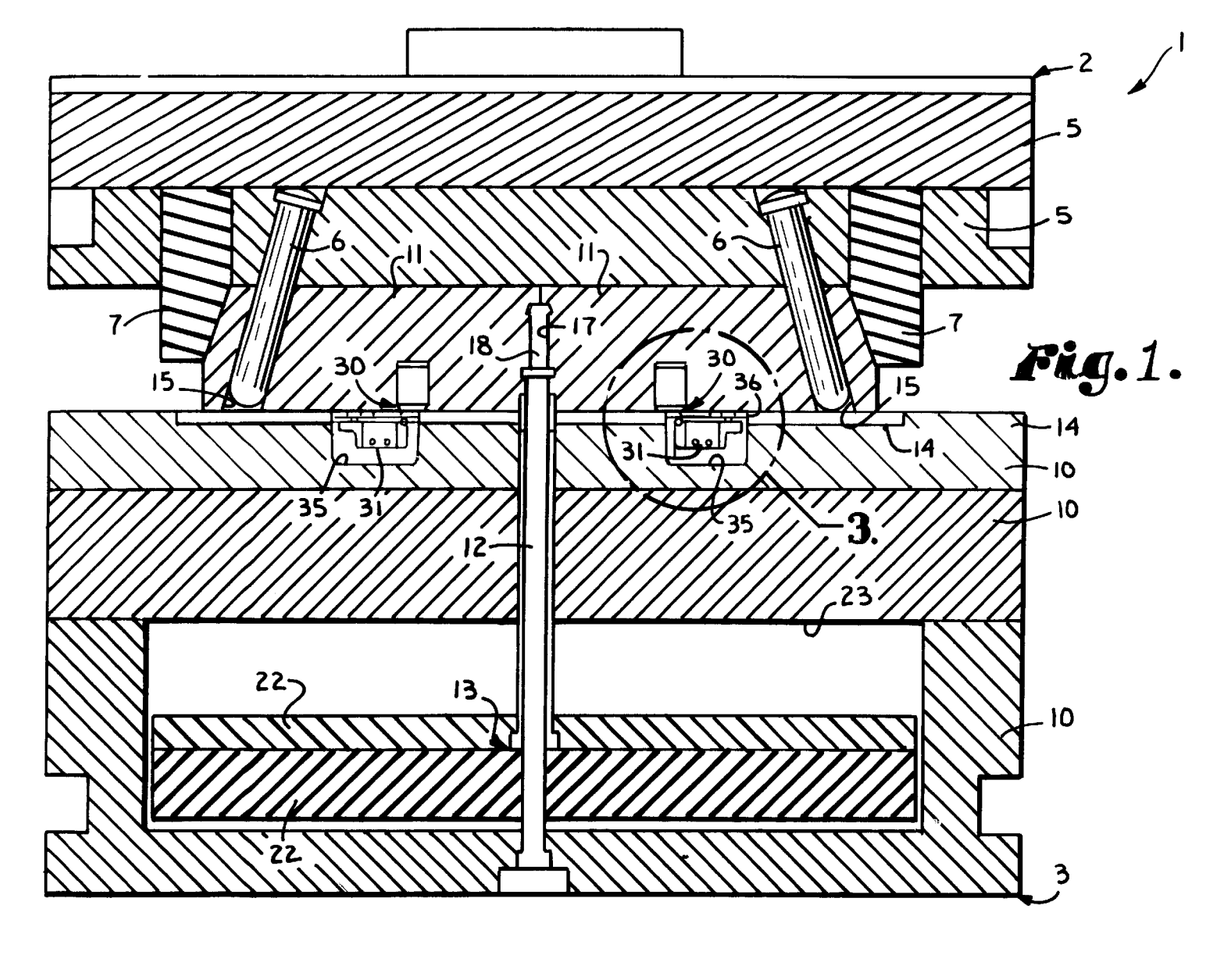
FIG. 1 is a simplified cross-sectional view of a conventional injection mold utilizing slides to form a molded part, shown in a closed position, and showing combination slide retainers and position sensing switches mounted relative to the slides of the mold halves.
Figure 2:
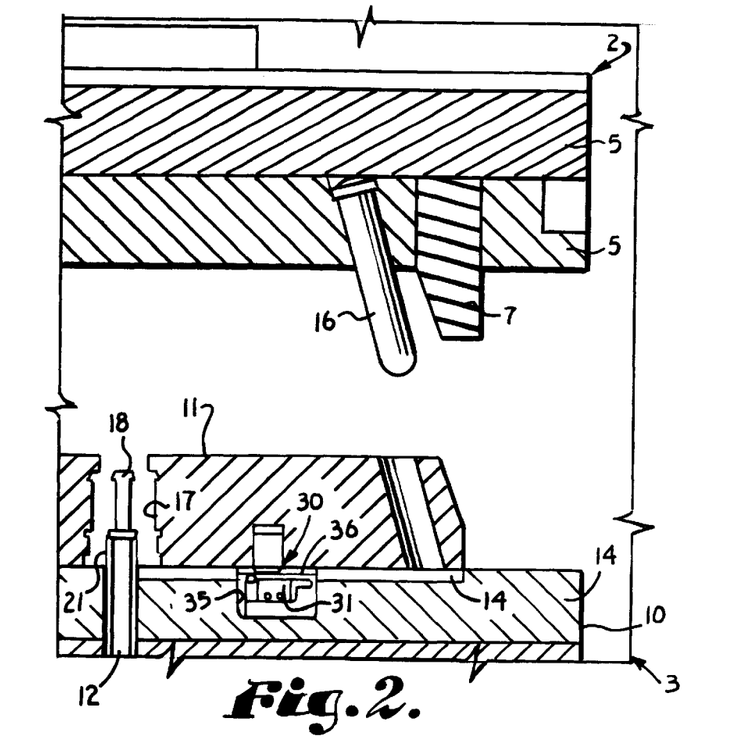
FIG. 2 is a partial cross-sectional view of the mold as shown in FIG. 1 shown in an open position.
Figure 3:
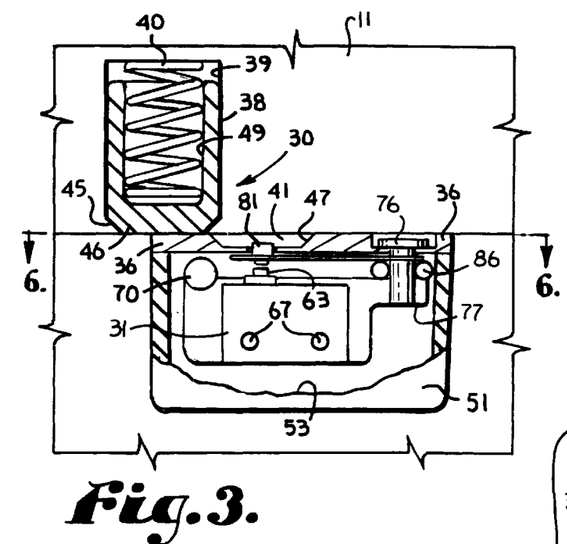
FIG. 3 is an enlarged and fragmentary view of the mold as shown in FIG. 1, showing one of the combination slide retainers and position sensing switches in greater detail.

Referring to the drawings in more detail, FIG. 1 is a simplified, cross-sectional view of a mold 1 shown in a closed alignment and which is typical of the type of mold with which the combination slide retainer and position sensing switch of the present invention is adapted for use. The mold 1 is shown in an open alignment in FIG. 2. The mold 1 comprises a first or stationary mold half 2 and a second or movable mold half 3. The mold halves 2 and 3 are adapted for securement in an injection molding machine (not shown) such that the movable mold half 3 is slidingly advanceable toward and away from the stationary mold half 2 between the closed alignment as shown in FIG. 1 and the open alignment as shown in FIG. 2. FIGS. 1 and 2 are simplified cross-sectional views of the mold halves 2 and 3 generally as viewed when looking down at the mold from above. However, for the purpose of this application directional references are relative to the orientation of the mold 1 as shown in FIG. 1 with the stationary mold half 2 generally being in the upper portion of the drawing and the movable mold half 3 being in the lower portion of the drawing.

The stationary mold half 2 comprises a plurality of stationary plates 5, cam pins 6, and heel blocks 7. The cam pins 6 extend outwardly from the stationary plates 5 at an oblique angle with respect to the direction of motion of the movable mold half 3 relative to the stationary mold half 2. The movable mold half 3 comprises a plurality of movable plates 10, slides 11, core part 12 and ejector assembly 13. The innermost movable plate or plates 10 may generally be referred to as a slide plate 14. The slides 11 are slidably mounted on the slide plate 14 to slide in a lateral direction, perpendicular to the direction of travel of the movable mold half 3 relative to the stationary mold half 2. As the mold halves 2 and 3 are advanced between open and closed alignments, the slides 11 are similarly advanced between an open alignment or position and a closed alignment or position through the action of the cam pins 6 relative to inclined bores 15 in each of the slides 11. When the slides 11 are in the open position, a tip of each cam pin 6 is aligned with an outermost opening of a corresponding inclined bore 15. As the movable mold half 3 is advanced toward the stationary mold half 2, the slides 11 are drawn inward toward one another by the engagement of the slides 11 by the cam pins 6 within the bores 15. The heel blocks 7 are positioned to engage outer ends of the slides 11 and hold or press the slides 11 in the closed position when the mold 1 is closed. As the movable mold half 3 is advanced away from the stationary mold half 2, the slides 11 are advanced toward the open position by the action of the cam pins 6 within bores 15. The slides 11 reach the open position when the tips of the cam pins 6 advance out of the inclined bores 15.

As best seen in FIG. 2, portions of a mold cavity 17, designed to produce a molded part 18 are formed in each of the slides 11 such that the mold cavity 17 is formed when the mold 1 and the slides 11 are advanced to the closed position. The molded part 18, as generally shown in FIGS. 1 and 2, comprises a stud for a grommet. The cylindrical core part 12 forms a bore or hole through the molded part 18. Plastic is injected into the mold cavity 17 by conventional means, not shown, when the mold 1 is closed. After a period of time selected to permit the molded part 18 to cool sufficiently, the mold 1 is opened. When the mold 1 is completely opened, the ejector assembly 13 is activated to eject the molded part 18 from the mold 1.

The ejector assembly 13 generally comprises an ejector sleeve 21 mounted in circumscribing relationship around the core part 12. The ejector sleeve 21 is mounted on ejector plates 22 which are movably mounted within an interior space 23 in the movable mold half 3. Activation of the ejector assembly 13 advances the ejector sleeve 21 out of the movable mold half 3, as generally shown in FIG. 2, so as to eject the molded part 18 from the mold 1. During operation of the mold 1, it is important that the slides 11 remain in the open position while the molded part 18 is ejected and until the inclined bores 15 in the slides 11 are advanced into encircling relation with the cam pins 6 as the mold 1 is closed to prevent damage to the ejector assembly 13 or to the cam pins 6 or slides 11.

A slide retainer 30 and a position sensing switch 31, are mounted to the mold halves 2 and 3 relative to each slide 11 for releasably retaining the slides 11 in the open position until the mold is closed and for verifying the position of the slides 11 in the open position. Each position sensing switch 31 is mounted within a switch cavity or recess 35 formed within the movable mold half 3 from the outer surface of the slide plate 14 such that the switch 31 is recessed in the slide plate 14. Each switch cavity 35 is covered by a cover plate 36 which is preferably formed from metal.

As best seen in FIGS. 3 through 7, each slide retainer 30 generally comprises a slide retainer plunger or locking member 38 positioned within a bore 39 in a corresponding slide 11, a spring 40 biasing the plunger 38 out of the bore 39 and a detent or receiver 41 formed in the cover plate 36. The slide retainer plunger 38 is preferably cylindrical with a beveled edge 45 extending around a head 46 of the plunger 38. The detent 41 is preferably frusto-conical in shape corresponding to the shape of the plunger head 46 and defined by an angled camming surface 47 in the cover plate 36. The plunger 38 is also preferably hollow such that the spring 40 extends into a cylindrical bore 49 of the plunger 38.

Each cover plate 36 is mounted to a switch housing 51 which is preferably formed from plastic. The switch housing 51 includes a cup 52 with an interior space or switch chamber 53 and flanges 54 and 55 (see FIG. 7) extending outward from an upper edge of the cup 52 on opposite sides of the chamber 53. Four posts 56 (two of which can be seen in FIG. 5) extend upward from the flanges 54 and 55, two per flange. The cover plate 36 includes four inverted frusto-conical bores 60 which align with the posts 56 of the switch housing flanges 54 and 55. The cover plate 36 is secured to the switch housing 51 by placing the cover plate 36 on top of the flanges 54 and 55 with the posts 56 extending into the aligned bores 60 and then swaging or melting the posts 56 in the bores 57.

The cover plate 36, with the switch housing 51 secured thereto, is positioned within the switch cavity 35 such that flanges 54 and 55 engage shoulders 58 and 59 formed in the movable mold half 3 or slide plate 14 as part of the switch cavity 35 and an outer surface of the cover plate 36 extends flush with an outer surface of the slide plate 14. The cover plate 36 and switch housing 51 are secured to the slide plate 14 by screws 60 extending through aligned bores 61 and 62 in the cover plate 36 and the flanges 54 and 55 of the switch housing 51 respectively.

The switch 31 is a conventional, relatively small, normally closed, plunger type switch. The switch 31 is activated or its condition or state is changed by compression of a switch plunger 63 extending from the switch 31. The switch 31 is mounted within the switch chamber 53 of housing 51 on a switch bracket 65. The bracket 65 includes a mounting wall 66 having a pair of switch mounting posts 67 extending transversely relative to the wall 66. The mounting posts 67 are sized and spaced to correspond with mounting holes 68 in switch 31. The switch 31 is secured to the switch bracket 65 by aligning the mounting holes 68 with the posts 67 and then pressing the switch against the bracket wall 66 such that the posts 67 are advanced into the mounting holes 68.

A trunnion or pivot shaft 70 is formed on and extends transversely to the bracket wall 66 from an upper corner thereof. Opposite ends of the trunnion 70 are pivotally supported in bearing grooves 71 formed in the sidewalls of the housing cup 52 generally at upper ends thereof. A mounting flange 74, having a threaded bore 75 extending therethrough, is formed on and extends away from the bracket wall 66 at an upper corner thereof opposite the trunnion 70.

The switch bracket 65 is connected to the cover plate 36 by an adjustment screw 76 extending through a countersunk bore 77 in the cover plate 36 and into the threaded bore 75 on the mounting flange 74 of the switch bracket 65. Rotation of the adjustment screw 76 pivots the switch bracket 65 and the switch 31 mounted thereto relative to the cover plate 36 and the detent 41.

The switch 31 is mounted on the switch bracket 65 such that the switch plunger 63 is positioned generally in axial alignment with and below an actuator hole 80 extending through the cover plate 36 and into the detent 41. An actuator button 81 is positioned adjacent and above the switch plunger 63 generally in axial alignment therewith and such that an upper portion or head 82 of the actuator button 81 extends through the actuator hole 80 and into the detent. The actuator button 81 is mounted on a first end 83 of a leaf spring 84. A second end 85 of the leaf spring 84 is secured to the adjustment screw 76. In particular, the adjustment screw 76 extends through a hole (not shown) in the second end 85 of the leaf spring 84 which is positioned below the cover plate 36, through a compressible O-ring 86 positioned below the second end 85 of leaf spring 84 and through the threaded bore 75 in mounting flange 74. The O-ring 86 generally acts as a spacer to maintain the second end 85 of leaf spring 84 pressed against the cover plate 36 yet is compressible to permit advancement of the mounting flange 74 of switch bracket 65 toward the cover plate 36. Rotation of the adjustment screw 76 pivots the switch bracket 65 and the switch 31 mounted thereto toward and away from the cover plate 36 thereby advancing the switch plunger 63 toward and away from the actuator button 81.

Figure 4:
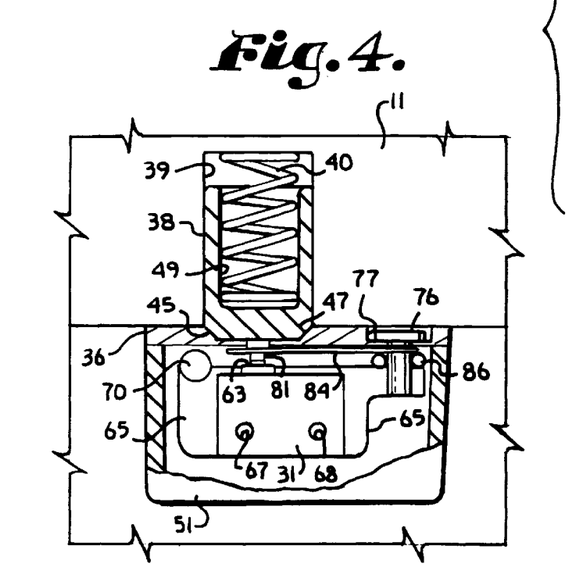
FIG. 4 is a view similar to FIG. 3 showing the mold in the open position.
Figure 5:
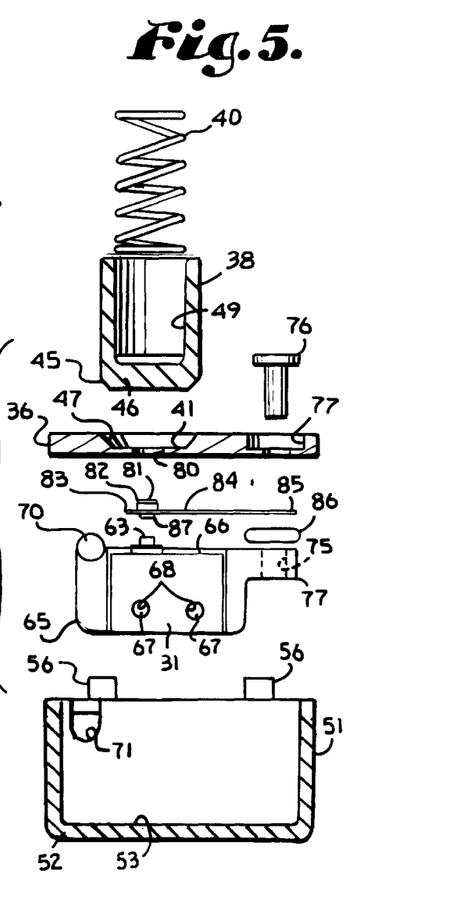
FIG. 5 is an exploded view of the combination slide retainer and position sensing switch.
Figures 6, 7:
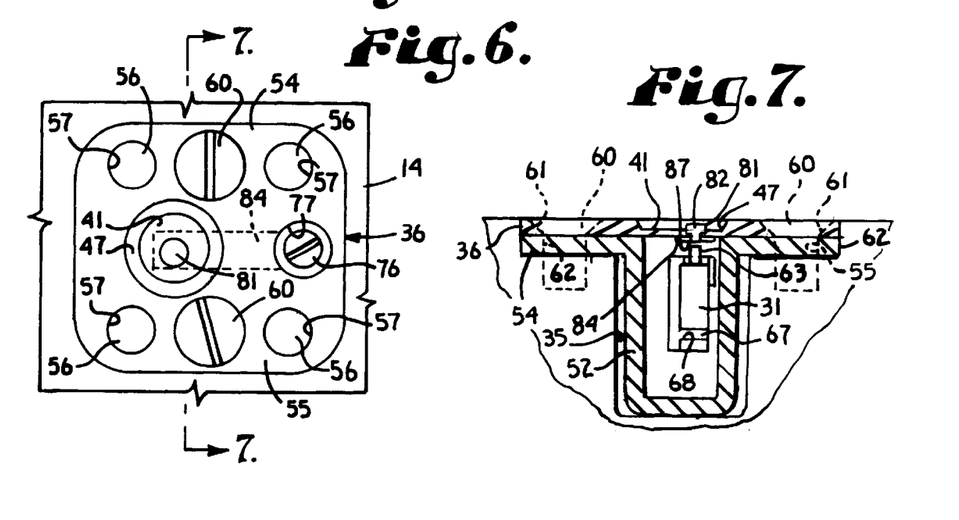
FIG. 6 is an enlarged cross-sectional view taken generally along line 6—6 of FIG. 3.
FIG. 7 is an enlarged and fragmentary cross-sectional view taken generally along line 7—7 of FIG. 6.

The slide retainer plunger 38 is positioned on the slide 11 relative to the detent 41 in the slide plate 14 such that when the slide 11 is advanced to the open position, the slide retainer plunger 38 is aligned with and biased into the detent 41. Engagement of the beveled edge 45 of the slide retainer plunger head 46 against the angled camming surface 47 in the cover plate 36, as generally shown in FIG. 4, prevents the slide 11 from sliding out of the open position until sufficient force is applied to the slide 11 such that the resultant force applied against the beveled edge 45 of the slide retainer plunger head 46 by the camming surface 47 compresses the slide retainer plunger 38 into the bore 39 against the biasing force of the spring 40. The force applied to the slide 11, as it is advanced back to the closed position upon closing of the mold 1, is sufficient to result in compression of the slide retainer plunger 38 into bore 39 against the biasing force of the spring 40.

When the head 46 of the slide retainer plunger 38 advances into the detent 41, it engages and advances the actuator button 81 toward the switch plunger 63, such that a lower portion or tail 87 of the actuator button 81 engages and compresses the switch plunger 63 and activates or changes the condition of the switch 31 from a first condition to a second condition. When the slide retainer plunger head 46 advances back out of the detent 41 and out of engagement with the actuator button 81, the actuator button 81 is advanced away from the switch plunger 63 by the leaf spring 84 allowing the switch plunger 63 to advance back outward (through the action of a spring not shown) de-activating or changing the condition of the switch 31 back to the first condition. The switch bracket 65 and the switch 31 mounted thereon are pivotally mounted relative to the cover plate 36, as discussed above, to permit adjustments to the spacing of the switch plunger 63 relative to the actuator button 81 ensuring that the switch 31 changes conditions upon advancement of the slide retainer plunger 38 into and out of the detent 41.

The actuator button 81 and the leaf spring 84 also form a seal or shield to prevent grease or debris from migrating through the actuator hole 80 to the switch plunger 63 and possibly interfering with the performance of the switch 31. The upper portion of the actuator button 81 substantially fills the actuator hole 80 which helps keep out grease and debris. The switch plunger 63 is further shielded from any grease or debris which might pass around the actuator button 81 and through the actuator hole 80 by the leaf spring 84.

The switch 31 is electrically connected to a controller (not shown) for the mold 1. Wiring for the switch (not shown) is run through a channel machined into the slide plate 14 preferably at the same time the switch cavity 35 is machined therein. The controller prevents the ejector assembly 13 from advancing the ejector sleeve 21 outward relative to the movable mold half 3 unless the switch 31 has been activated through advancement of the slide retainer plunger 38 into the detent 41, indicating that the slide 11 is in the open position. Similarly, the controller prevents the mold 1 from closing unless the switch 31 has been activated through advancement of the slide retainer plunger 38 into the detent 41, indicating that the slide 11 is in the open position.

Figure 8:
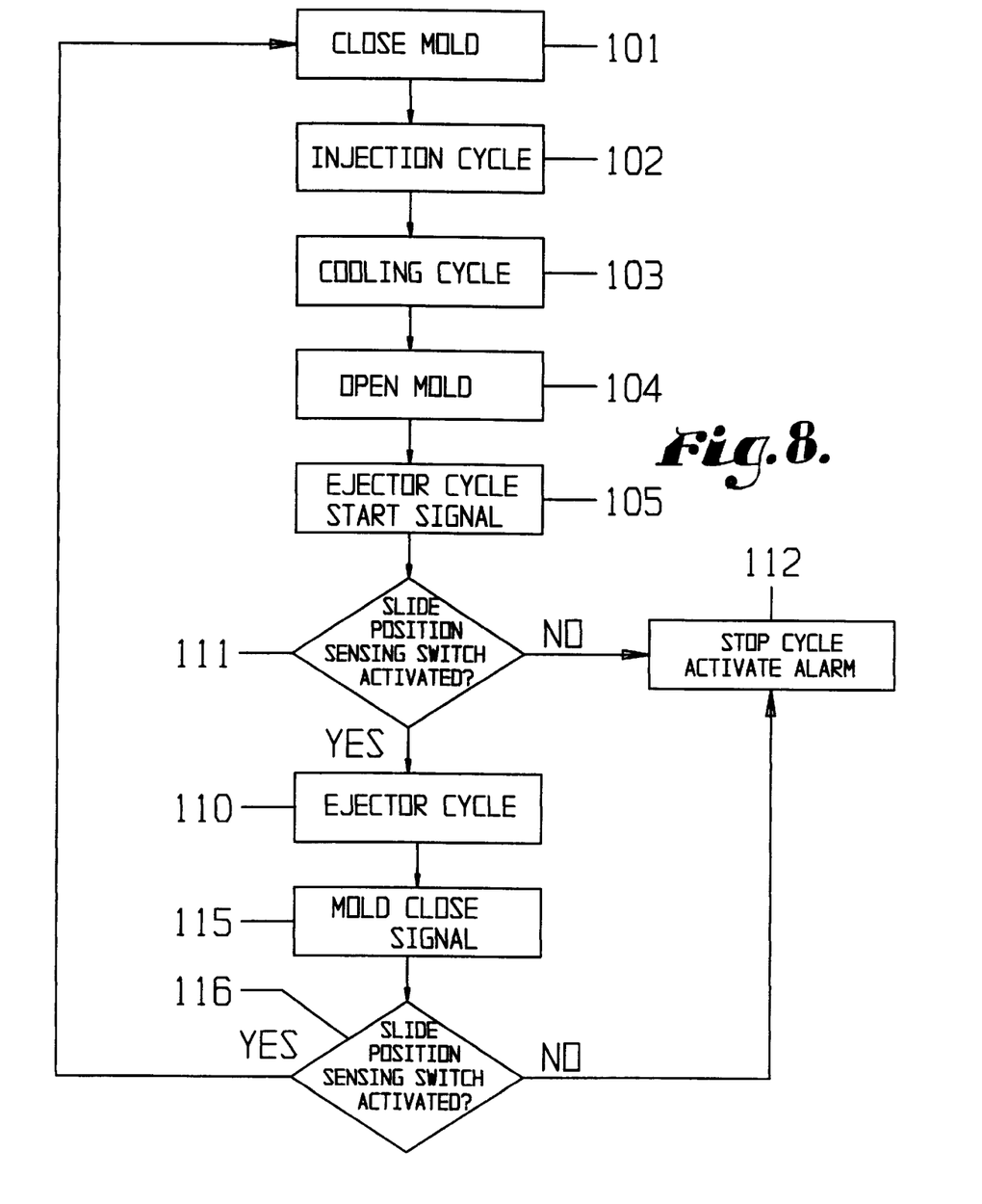
FIG. 8 is a logic diagram of the control system of a mold utilizing the combination slide retainer and position sensing switch.

A logic diagram for a process controller for a mold cycle of a mold utilizing the combination slide retainer 30 and position sensing switch 31 is shown in FIG. 8. In the first step 101, the mold is closed. Plastic is injected into the mold 1 during an injection cycle 102 and the plastic is allowed to cool during a cooling cycle 103. After the cooling cycle 103, the mold opens in a mold opening step 104.

Upon opening of the mold 1, the slide retainer plunger 38 should advance into the detent 41 changing the condition of or activating switch 31, verifying that the slide 11 is in the open position. After the mold opening step 104, the controller sends out a signal 105 to start the ejector cycle 110.

Upon sending of the ejector cycle start signal 105, a decision is made at 111. If the position sensing switch 31 is not activated, indicating that the slide 11 is not in the open position, the process proceeds to a shutdown step 112, wherein the mold cycle stops and an alarm is activated. If the position sensing switch 31 has been activated, verifying that the slide 11 is in the open position, the ejector cycle 110 begins.

Upon completion of the ejector cycle 110, the controller sends out a signal 115 to repeat the first step 101 of closing the mold 1. Upon sending of the mold close signal at 115, a decision is made at 116. If the position sensing switch 31 is not activated, indicating that the slide 11 is not in the open position, the process proceeds to the shutdown step 112, wherein the mold cycle stops and an alarm is activated. If the position sensing switch 31 has been activated, verifying that the slide 11 is in the open position, the mold close step 101 and the mold cycle is repeated.

It is to be understood that although the slide retainer plungers 38 are shown secured to the slides 11 and the switches 31 and cover plates 36 with detents 41 are secured to the slide plate 14, it is foreseen that the slide retainer plungers 38 could be secured to the slide plate 14 and the switches 31 and cover plates 36 with detents 41 could be secured to the slides 11.

It is also foreseen that the geometry of the slide retainer plungers 38 and the detents 41 could be varied. For example, the plunger 38 could be a ball type plunger and the detent 41 hemispherical.

It is also foreseen that the position of the switch 31 relative to the slide retainer 30 could be varied while still providing the same functionality. For example, the switch 31 could be positioned in a cavity adjacent the bore 39 for the slide retainer plunger 38 such that the slide retainer plunger 38 engages and compresses the switch plunger 63 when the slide retainer plunger 38 is compressed within the bore 39 when the slide 11 is not in the open position. When the slide 11 advances to the open position and the slide retainer plunger 38 is biased outward from the bore 39 and into the detent 41, the slide retainer plunger 38 would advance away from the switch plunger 63 causing the switch to change conditions, electronically verifying the position of the slide 11 in the open position.

It is also foreseen that the slide retainer could be of a type other than a plunger/detent type retainer. For example, it is foreseen that the slide retainer could be of the type shown in U.S. Pat. No. 4,768,747 wherein the locking member comprises a dowel pin secured to the slide and the receiver comprises a slide clip secured to the slide plate and having resilient jaws for grasping the dowel pin between the jaws (the mouth) to releasably secure the slide in an open position. A switch could be mounted in a cavity in the slide clip adjacent the mouth such that the switch plunger extends into the mouth. Advancement of the dowel pin into and out of the mouth would then change the condition of the switch.

It is also foreseen that the slide retainer and position sensing device of the present invention could be used in a wide variety of applications, other than in injection molding applications, in which a pair of plates or members are mounted in sliding relationship and it is necessary to releasably maintain and verify that the plates are positioned in a desired position.

It is to be understood that while certain forms of the present invention have been illustrated and described herein, it is not to be limited to the specific forms or arrangement of parts described and shown.

What is claimed and desired to be secured by Letters Patent is as follows:

1. A slide retainer and position sensing device for a mold having first and second mold halves advanceable toward and away from each other, at least one of the mold halves having a slide plate and a slide, in which a portion of a mold cavity is formed, attached thereto; said slide sliding laterally inwardly and outwardly on the slide plate as the mold halves are drawn together or pulled apart, the slide retainer and position sensing device comprising:

a) a locking member secured to a first of said slide or said slide plate;

b) a receiver formed in a second of said slide or said slide plate and positioned to receive said locking member when said slide is advanced outward to an open alignment as the mold halves are opened, to prevent further movement of the slide relative to the slide plate until the mold halves are drawn together again; and c) a switch recessed in said slide or said slide plate and positioned relative to said locking member or said receiver such that advancement of said locking member into said receiver changes the condition of said switch.

2. In a slide retainer for a mold having first and second mold halves advanceable toward and away from each other, at least one of the mold halves having a slide plate and a slide, in which a portion of a mold cavity is formed, which slides laterally inwardly and outwardly on the slide plate as the mold halves are drawn together or pulled apart, wherein the slide retainer comprises a locking member mounted on a first of the slide or the slide plate and further comprises a receiver on a second of the slide or the slide plate and wherein the receiver is positioned to releasably receive the locking member when the slide is advanced outward to an open alignment; the improvement comprising:

a) a switch recessed in the slide or the slide plate and positioned relative to the locking member and the receiver such that advancement of the locking member into the receiver changes the condition of said switch.

3. In a mold having first and second mold halves advanceable toward and away from each other, at least one of the mold halves having a slide plate and a slide with a portion of a mold cavity formed therein which slides laterally inwardly and outwardly on the slide plate as the mold halves are drawn together or pulled apart, the improvement comprising:

(a) a slide retainer plunger secured within a bore in a first of said slide or said slide plate and biasingly urged out of said bore by a spring;

(b) a switch cavity formed in a second of said slide or said slide plate;

(c) a cover plate securable to said slide or said slide plate across said switch cavity; said cover plate having a detent formed therein; said detent sized and positioned to receive a portion of said slide retainer plunger when said slide is advanced to an open position relative to said slide plate; said slide retainer plunger and said detent cooperatively shaped to retain the plunger in the detent until the mold halves are drawn together; and (d) a switch positioned within said switch cavity such that advancement of said slide retainer plunger into and out of said detent changes the switch condition.

4. The improved mold as in claim 3 wherein:

(a) an actuator receiving hole extends through said cover plate into said detent;

(b) said switch is positioned within said switch cavity such that a switch plunger extends in alignment with said actuator receiving hole; and (c) an actuator button is slidingly mounted within said actuator receiving hole such that a head of said actuator button is biased into said detent and a tail of said actuator button extends below said cover plate in closely spaced relation to said switch plunger.

5. The improved mold as in claim 4 wherein:

(a) said actuator button is mounted on a leaf spring connected to and extending below said cover plate.

6. The improved mold as in claim 4 wherein:

(a) said switch is mounted within said switch cavity such that the distance between said switch plunger and said slide retainer plunger is adjustable.

7. The improved mold as in claim 4 further comprising:

a) a switch housing mounted to said cover plate and extending into said switch cavity and having a switch chamber formed therein; and b) a switch bracket to which said switch is securable;

said switch bracket mounted within said switch chamber in said switch housing such that a plunger of said switch is positioned in alignment with said slide retainer plunger such that advancement of said slide retainer plunger into said detent compresses said switch plunger; a first end of said switch bracket is pivotally connected to said switch housing and a second end of said switch bracket includes a mounting flange which is threadingly connected to an adjustment screw extending through said cover plate; such that rotation of said adjustment screw pivots said switch plunger of said switch secured to said bracket toward or away form said actuator button.

8. The improved mold as in claim 3 wherein:

(a) said bore in which said slide retainer plunger is secured is formed within said slide; and (b) said switch cavity is formed in said slide plate.

9. A slide retainer and position sensing device for a mold having first and second mold halves advanceable toward and away from each other, at least one of the mold halves having a slide plate and a slide, in which a portion of a mold cavity is formed, attached thereto and which slides laterally inwardly and outwardly on the slide plate as the mold halves are drawn together or pulled apart, the slide retainer and position sensing device comprising:

(a) a slide retainer plunger secured within a bore in a first of said slide or said slide plate and biasingly urged out of said bore by a spring;

(b) a switch cavity formed in a second of said slide or said slide plate;

(c) a cover plate securable to said slide or said slide plate across said switch cavity; said cover plate having a detent formed therein; said detent sized and positioned to receive a portion of said slide retainer plunger when said slide is advanced to an open position relative to said slide plate; said slide retainer plunger and said detent cooperatively shaped to retain the plunger in the detent until the mold halves are drawn together; and (d) a switch positioned within said cavity such that advancement of said slide retainer plunger into and out of said detent changes the switch condition.

10. The slide retainer and position sensing device as in claim 9 wherein:

(a) an actuator receiving hole extends through said cover plate into said detent;

(b) said switch is positioned within said switch cavity such that a switch plunger extends in alignment with said actuator receiving hole; and (c) an actuator button is slidingly mounted within said actuator receiving hole such that a head of said actuator button is biased into said detent and a tail of said actuator button extends below said cover plate in closely spaced relation to said switch plunger.

11. The slide retainer and position sensing device as in claim 10 wherein:

(a) said actuator button is mounted on a leaf spring connected to and extending below said cover plate.

12. The device as in claim 10 wherein:

(a) said switch is mounted within said cavity such that the distance between said switch plunger and said slide retainer plunger is adjustable.

13. The device as in claim 9 further comprising:

(a) a switch housing mounted to said cover plate and extending into said switch cavity and having a switch chamber formed therein; and (b) a switch bracket to which said switch is securable; said switch bracket mounted within said switch chamber in said switch housing such that a plunger of said switch is positioned in alignment with said slide retainer plunger such that advancement of said slide retainer plunger into said detent compresses said switch plunger; a first end of said switch bracket is pivotally connected to said switch housing and a second end of said switch bracket includes a mounting flange which is threadingly connected to an adjustment screw extending through said cover plate such that rotation of said adjustment screw pivots the switch bracket toward or away from said cover plate.

14. The device as in claim 9 wherein:

(a) said bore in which said slide retainer plunger is secured is formed within said slide; and (b) said switch cavity is formed in said slide plate.

15. A slide retainer and position sensing device for use in a mold having a slide mounted in sliding relation to a slide plate for sliding between a first position and a second position, the slide retainer and position sensing device comprising:

(a) a slide retainer plunger secured within a bore in a first of said slide and said slide plate and biasingly urged out of said bore by a spring;

(b) a switch cavity formed in a second of said slide and said slide plate;

(c) a cover plate securable to said second of said slide and said slide plate across said switch cavity; said cover plate having a detent formed therein; said detent sized and positioned to receive a portion of said slide retainer plunger when said slide and said slide plate are advanced to said second position; said slide retainer plunger and said detent cooperatively shaped to retain the plunger in the detent until said slide and said slide plate are advanced back toward said first position under sufficient force to overcome the biasing force of said spring on said slide retainer plunger; and (d) a switch positioned within said switch cavity such that advancement of said slide retainer plunger into and out of said detent changes the switch condition.

16. The slide retainer and position sensing device as in claim 15 wherein:

(a) an actuator receiving hole extends through said cover plate into said detent;

(b) said switch is positioned within said switch cavity such that a switch plunger extends in alignment with said actuator receiving hole; and (c) an actuator button is slidingly mounted within said actuator receiving hole such that a head of said actuator button is biased into said detent and a tail of said actuator button extends below said cover plate in closely spaced relation to said switch plunger.

17. The slide retainer and position sensing device as in claim 16 wherein:

(a) said actuator button is mounted on a leaf spring connected to and extending below said cover plate.

18. The device as in claim 16 wherein:

(a) said switch is mounted within said switch cavity such that the distance between said switch plunger and said slide retainer plunger is adjustable.

19. The device as in claim 16 further comprising:

a) a switch housing mounted to said cover plate and extending into said switch cavity and having a switch chamber formed therein; and b) a switch bracket to which said switch is securable; said switch bracket mounted within said switch chamber in said switch housing such that a plunger of said switch is positioned in alignment with said slide retainer plunger such that advancement of said slide retainer plunger into said detent compresses said switch plunger; a first end of said switch bracket is pivotally connected to said switch housing and a second end of said switch bracket includes a mounting flange which is threadingly connected to an adjustment screw extending through said cover plate; such that rotation of said adjustment screw pivots said switch plunger of said switch secured to said bracket toward or away form said actuator button.

20. The device as in claim 15 wherein:

(a) said bore in which said slide retainer plunger is secured is formed within said slide; and (b) said switch cavity is formed in said slide plate.

* * * * *